United States Patent [19]

Corso

[11] 4,448,583

[45] May 15, 1984

[54] STABLE AQUEOUS LIQUID COMPOSITION OF REACTIVE DYES CONTAINING β-SULFATOETHYLSULFONYL GROUPS

[75] Inventor: Anthony J. Corso, Coventry, R.I.

[73] Assignee: American Hoechst Corporation, Somerville, N.J.

[21] Appl. No.: 468,513

[22] Filed: Feb. 22, 1983

[51] Int. Cl.$^3$ .................. D06P 67/00; C09B 62/00
[52] U.S. Cl. ............................................. 8/527; 8/549
[58] Field of Search .................................. 8/527, 549

[56] References Cited

U.S. PATENT DOCUMENTS

| | | | |
|---|---|---|---|
| 4,035,350 | 7/1977 | Landler et al. | 260/152 |
| 4,035,351 | 7/1977 | Schlafer et al. | 260/196 |
| 4,072,463 | 2/1978 | Schlafer et al. | 8/41 B |
| 4,078,884 | 3/1978 | Opitz et al. | 8/1 D |
| 4,118,184 | 10/1978 | Opitz et al. | 8/26 |
| 4,149,850 | 4/1979 | Schlafer et al. | 8/41 R |
| 4,349,349 | 9/1982 | Nakatsuka et al. | 8/527 |

*Primary Examiner*—A. Lionel Clingman
*Attorney, Agent, or Firm*—Hugh C. Crall; Stephen P. Williams

[57] ABSTRACT

An aqueous, liquid fiber-reactive dye composition which is stable to decomposition is disclosed. The composition consists essentially of 5 to 45% by weight of a water-soluble, fiber-reactive dyestuff having from 1 to 3 β-sulfatoethylsulfonyl ($-SO_2CH_2CH_2OSO_3H$) groups, or a mixture of such dyestuffs; 0 to 10% by weight of water-soluble inert inorganic salt; and 45 to 95% by weight of water. Said liquid dye composition must have a pH of about 2.5 to about 4.5 and must be substantially free of buffer substances. The liquid dye composition may be stored for long periods of time at 0° to 50° C. with substantially reduced decomposition to the vinylsulfonyl dye form.

12 Claims, No Drawings

STABLE AQUEOUS LIQUID COMPOSITION OF REACTIVE DYES CONTAINING β-SULFATOETHYLSULFONYL GROUPS

The present invention relates to an aqueous, liquid fiber-reactive dye composition which is stable to decomposition.

There are several patents which describe liquid reactive dye preparations. Most notably are U.S. Pat. No. 4,072,463, U.S. Pat. No. 4,078,884, U.S. Pat. No. 4,118,184 and U.S. Pat. No. 4,149,850, which, in essence, describe aqueous preparations containing 5 to 35% (45% in one instance) reactive dyestuff of the formula $(HO_3S)_m-F-Z_n$, where F is the chromophoric radical and Z is the fiber-reactive group, 1 to 5% (or 6%) buffer substances, and having a pH of 3 to 7. The preferred pH for the liquid preparations is stated to be 5.5 to 6.8 in each patent and most of the examples illustrate buffered liquid preparations having a pH in that range.

In U.S. Pat. No. 4,349,349 there is disclosed liquid preparations of C.I. Reactive Blue 19 which contain 10 to 50 parts dyestuff, 1 to 40 parts formaldehyde/naphthalene sulfonic acid condensation product, and 0.1 to 10 parts nonionic surfactant. All the examples illustrate dye compositions adusted to pH 5.5 with the composition of Example 1 also containing sodium acetate buffer.

Applicant has found that liquid preparations of reactive dyestuffs which contain the fiber-reactive group β-sulfatoethylsulfonyl ($-SO_2CH_2CH_2OSO_3H$), when prepared according to the preferred conditions of the above-described patents, are subject to decomposition during long-term storage. That is, the β-sulfatoethylsulfonyl group of said dyestuffs will decompose to the vinylsulfonyl form ($-SO_2CH=CH_2$). While the vinylsulfonyl form of the dyestuff is an active dye form and will react with the fiber, applicant has found it to be disadvantageous to have significant portions of the dyestuff in this form prior to the actual dyeing application.

Since the vinylsulfonyl form is much less soluble than the β-sulfatoethylsulfonyl form, dyestuff may precipitate out of liquid concentrates as decomposition to the vinylsulfonyl form proceeds, thus reducing dyestuff (tinctorial) strength. This is particularly a problem where the dyestuff involved is a monosulfonic acid or where a highly concentrated dyestuff solution is desired. In either situation the liquid composition may be very close to the saturation point and any shift to the less-soluble dyestuff form may not be tolerated.

Applicant has also found that liquid dyestuff preparations which, through decomposition, contain significant portions of dyestuff in the vinylsulfonyl form are undesirable with respect to subsequent dyeing operations. Such preparations may produce uneven dyeings or superficial surface dyeings due to premature fixing of the active vinylsulfonyl form onto the fiber. Also, excess alkali will remain unconsumed in the dyeing solution since there is less sulfate ester to be hydrolized than expected. This excess alkali can reverse the dyeing process through hydrolysis of the dyestuff-fiber bond.

SUMMARY OF THE INVENTION

Applicant has discovered an aqueous, liquid fiber-reactive dye composition which is stable to decomposition. Applicant's composition consists essentially of 5 to 45% by weight of a water-soluble, fiber-reactive dyestuff having from 1 to 3 β-sulfatoethylsulfonyl ($-SO_2CH_2CH_2OSO_3H$) groups, or a mixture of such dyestuffs; 0 to 10% by weight of water-soluble inert inorganic salt; and 45 to 95% by weight of water. Said liquid dye composition must have a pH of about 2.5 to about 4.5 and must be substantially free of buffer substances. Applicant's liquid dye composition may be stored for long periods of time, for example, in excess of thirty days, at 0° to 50° C. with substantially reduced decomposition to the vinylsulfonyl dye form.

DESCRIPTION OF THE PREFERRED EMBODIMENTS

The reactive dyes which may be utilized in the composition of the present invention may be any of those known in the art, provided that from 1 to 3 β-sulfatoethylsulfonyl groups are present. Such dyes are well-known and are described, for example, in U.S. Pat. No. 4,072,463, U.S. Pat. No. 4,078,884, U.S. Pat. No. 4,088,441, U.S. Pat. No. 4,118,184, U.S. Pat. No. 4,149,850 and U.S. Pat. No. 4,271,072, the disclosures of which are incorporated herein by reference.

More particularly, suitable fiber-reactive dyestuffs may, in their free acid form, correspond to the formula $(HO_3S)_m-F-(SO_2CH_2CH_2OSO_3H)_n$ wherein F is the chromophoric radical of a monoazo, disazo, anthraquinone or phthalocyanine dyestuff, or a copper, nickel, chromium or cobalt metal complex thereof, m is an integer from 1 to 4, an n is an integer from 1 to 3. Of course, any of the water-soluble metal salts of these dyestuffs may be utilized, particularly the lithium, sodium and potassium salts.

Fiber-reactive dyestuffs found to be especially useful in the composition of the present invention correspond to the following formulae (in their free acid form):

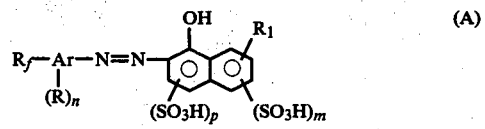

(A)

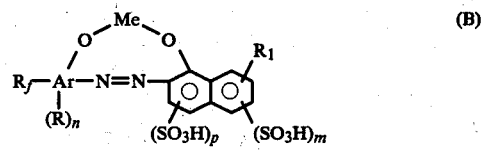

(B)

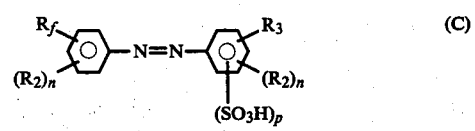

(C)

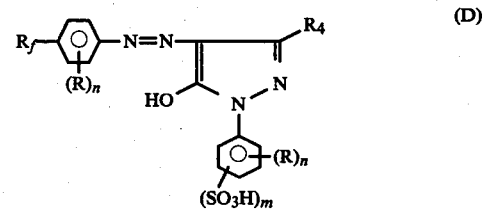

(D)

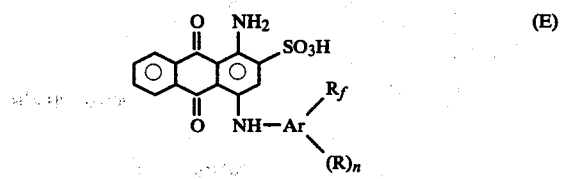

(E)

-continued

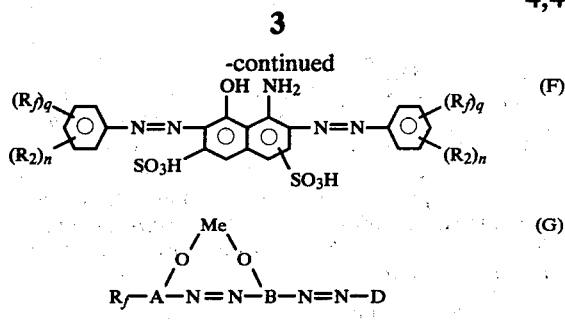

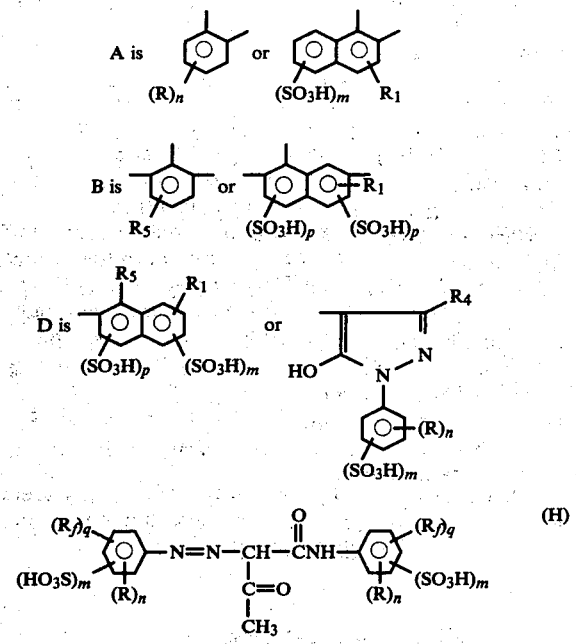

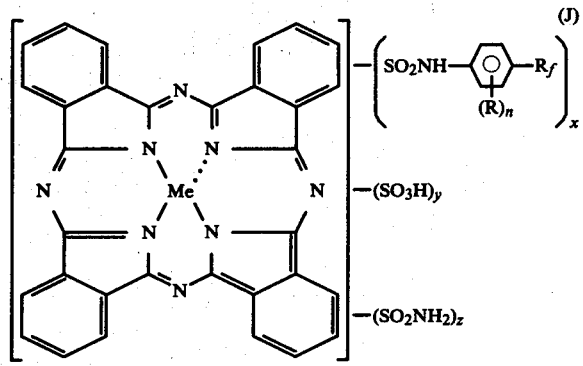

wherein
Ar is

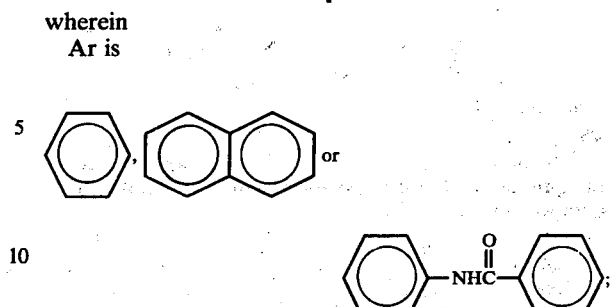

$R_f$ is —SO$_2$CH$_2$CH$_2$OSO$_3$H;

R is independently selected from lower alkyl, lower alkoxy, bromo, chloro, nitro, trifluoromethyl, lower alkylamino, carboxy and sulfo;

$R_1$ is independently selected from amino, lower alkylamino, lower alkanoyl amino, benzoyl amino, and benzoyl amino substituted by chloro, bromo, nitro, trifluoromethyl, lower alkyl or lower alkoxy;

$R_2$ is independently selected from R and $R_1$;

$R_3$ is H, —NHCH$_2$CH$_2$OH, —N(CH$_2$CH$_2$OH)$_2$, $$-NHCH_2CH_2O\overset{O}{\overset{\|}{C}}CH_3, -N(CH_2CH_2O\overset{O}{\overset{\|}{C}}CH_3)_2,$$

—NHCH$_2$CH$_2$OSO$_3$H, —N(CH$_2$CH$_2$OSO$_3$H)$_2$, —NHCH$_2$CH$_2$CN' or —N(CH$_2$CH$_2$CN)$_2$;

$R_4$ is lower alkyl, carboxy, lower alkoxy carbonyl, or carbamoyl;

$R_5$ is H or OH;

Me is Cu, Ni, Co, or Cr;

m is independently 0, 1 or 2;

n is independently 0, 1 or 2;

p is independently 0 or 1;

q is independently 0 or 1, provided that at least one q in a given structure is 1; and x and y are independently 1 or 2, and z is 0, 1 or 2, provided that x+y+z=3 or 4.

Dyestuffs which are most especially preferred for use in the present invention are those which in their free acid form have the following formulae:

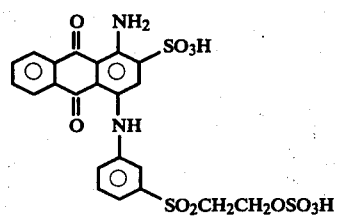

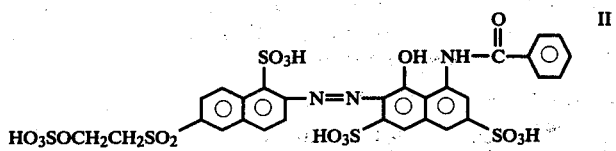

-continued
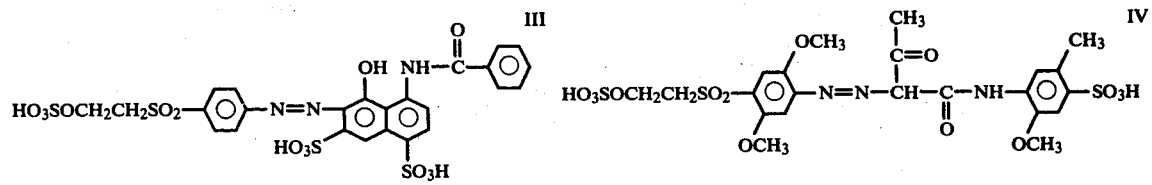
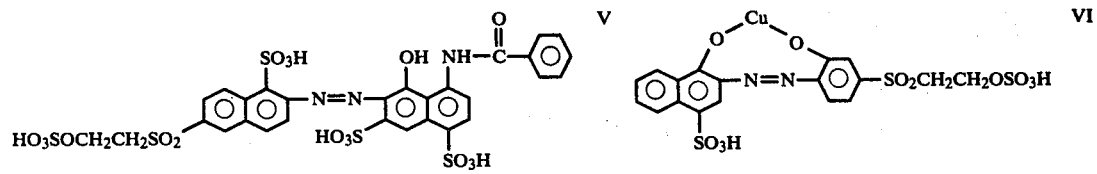
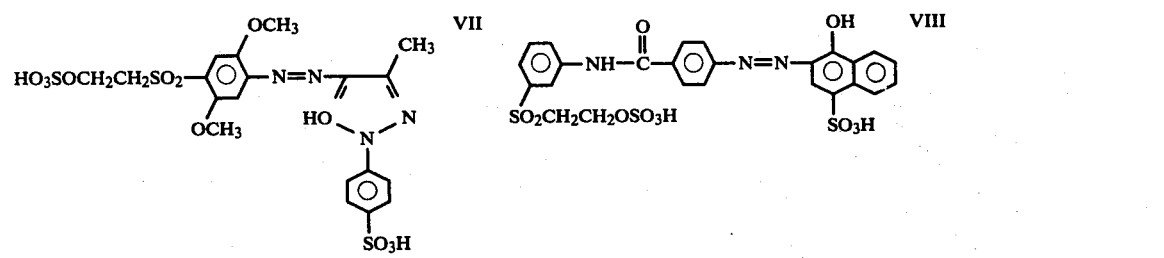
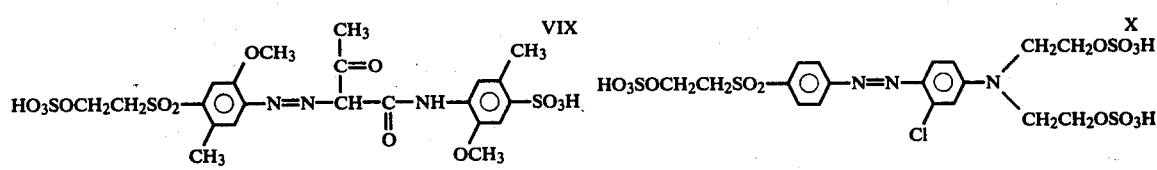
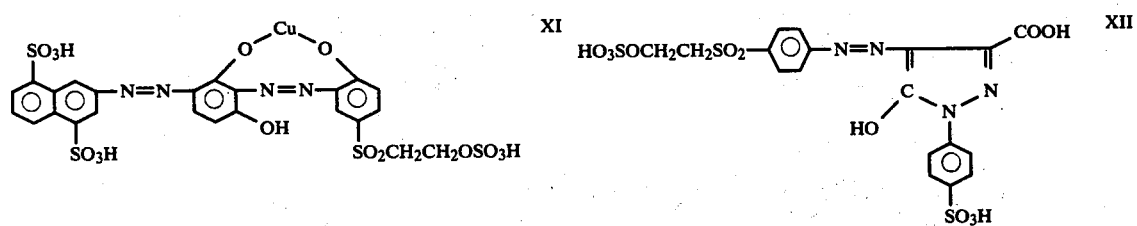
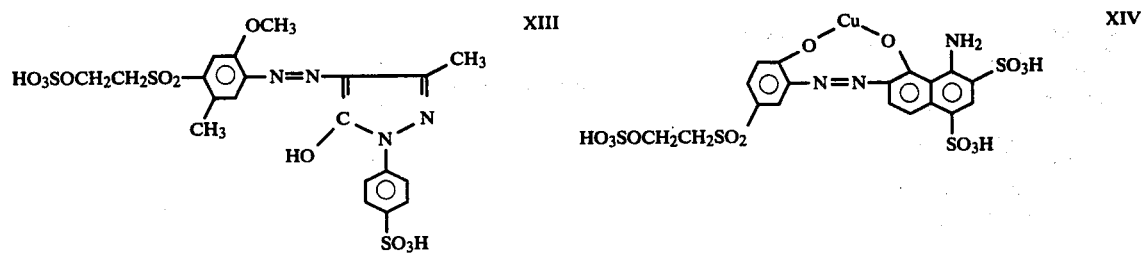
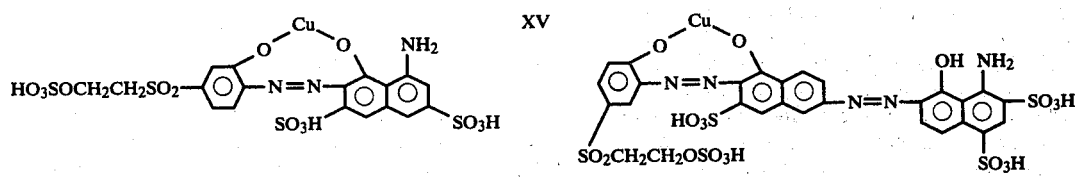
R = H  XVII
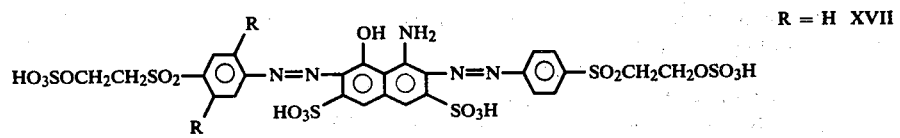

R = OCH₃   XVIII

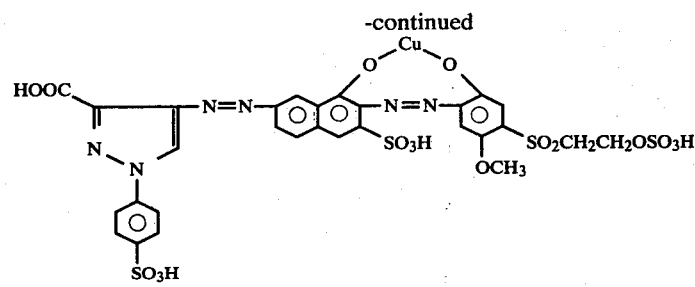

XIX

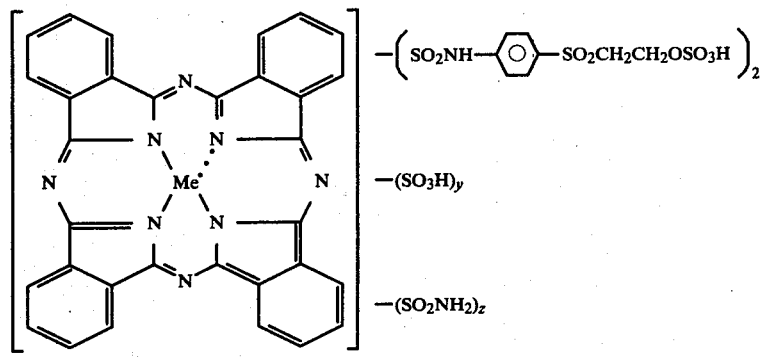

Me = Cu  y = z  z = o   XX

Me = Ni  y = z  z = o   XXI    Me = Cu  y = 1  z = 1   XXII

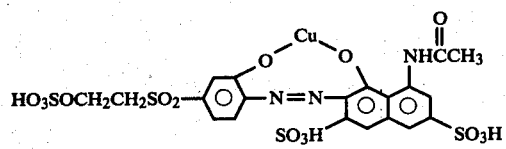

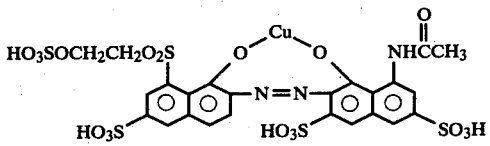

XXIII

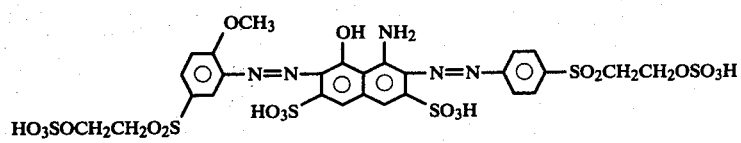

XXVI

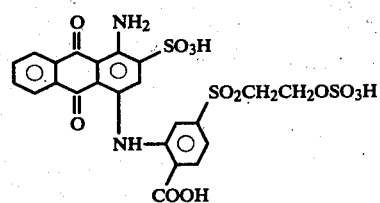

XXVII

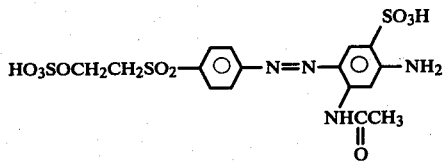

XXVIII

The composition of the present invention is particularly advantageous for liquid preparations of fiber-reactive dyestuffs which are monosulfonic acids, that is dyestuffs of the formula (HO₃S)$_m$—F—(SO₂CH₂CH₂OSO₃H)$_n$ wherein F is as previously defined and m is 1, most particularly n also being 1. Such monosulfonic acids have borderline solubility and partial decomposition to the less soluble vinylsulfonyl form could cause precipitation of the dyestuff. Applicant's composition avoids or substantially reduces the decomposition of such dyestuffs so that they may be kept in solution over long periods of time.

The composition of the present invention also finds particular advantage where highly concentrated liquid preparations are desired. For example, a liquid preparation containing 30 to 40% by weight of dyestuff may be close to the saturation point. In such a case partial decomposition to the less soluble vinylsulfonyl form could cause dyestuff precipitation. Applicant's composition, being more stable to such decomposition, may accordingly be stored safely for a long period of time.

The composition of the present invention may contain from 0 to 10% water-soluble, inert inorganic salt. Preferably, it will contain no more than 6% of such salt. Typical of such salts are the alkali metal (lithium, sodium, potassium) or ammonium chlorides or sulfates or mixtures thereof.

The composition of the present invention may also optionally contain agents normally utilized to aid dyestuff solubility or subsequent processing. Typically, these may include caprolactam, surfactants, naphthalene sulfonic acid/formaldehyde condensation product, anthraquinone-2-sulfonic acid, etc.

The invention may be further illustrated by the following example in which the parts and percentages are be weight.

EXAMPLE

Aqueous liquid dyestuff compositions were tested for stability in the following manner. Aqueous solutions of the dyestuffs having the structural formulae previously identified as I to VI were placed in a covered glass container, adjusted to an initial pH as indicated in the Table, and stored in an oven at 40° C. These aqueous dyestuff solutions were made up to 25% standard dyestuff strength and contained about 14–18% dyestuff, 0 to 6% inorganic salt, and in some instances (as indicated in the Table) 2 or 3% buffer (phosphate salts). Each aqueous dyestuff sample was analyzed for vinylsulfone content prior to the storage test and from time to time thereafter. The net increase in vinylsulfone content for various storage periods is shown in the Table. As can be seen from the Table, the liquid dyestuff compositions maintained at pH 4.5 or lower and containing no buffer showed dramatically less vinylsulfone formation during storage than the corresponding compositions maintained at higher pH or containing buffer.

TABLE

| Dyestuff No. | Initial pH | Buffer Content | Vinylsulfone formation (final % minus initial %) | | | | | |
|---|---|---|---|---|---|---|---|---|
| | | | 7 days | 14 days | 28 days | 35 days | 56 days | 105 days |
| I | 6.0 | 2% | 6.0 | 9.0 | 10.0 | 10.5 | — | — |
| | 4.5 | 2% | 0.5 | 0.5 | 2.5 | 2.5 | — | — |
| II | 5.5 | 2% | 14.5 | — | 17.0 | — | — | — |
| | 4.5 | 2% | 4.5 | — | 6.0 | — | — | — |
| III | 6.0 | 3% | 16.5 | — | >20 (ppt) | — | — | — |
| | 6.0 | 0 | 9.5 | — | 13.0 | — | — | — |
| | 4.5 | 3% | 1.5 | — | 3.5 | — | — | — |
| | 4.5 | 0 | 0.5 | — | 2.5 | — | — | — |
| IV | 5.5 | 0 | 3.7 | 4.5 | 5.3 | — | — | 7.8 |
| | 4.5 | 0 | 0.8 | 0.7 | 1.4 | — | — | 2.4 |
| V | 5.0 | 0 | 7.5 | 10.0 | 12.3$^a$ | 14.3 | 16.8 | — |
| | 2.5 | 0 | 0 | 0 | 0.1$^a$ | 0.2 | 0.8 | — |
| | 3.5 | 0 | 0.2 | 0.5 | 1.0$^a$ | 1.4 | 3.6 | — |
| VI | 6.0 | 0 | 3.3 | 4.6 | 6.6 | — | 8.9 | — |
| | 4.5 | 0 | 0 | 0 | 0 | — | 0.3 | — |

$^a$Value at 27th day

What is claimed is:

1. An aqueous, liquid fiber-reactive dye composition which is stable to decomposition consisting essentially of 5 to 45% by weight of a water-soluble, fiber-reactive dyestuff having from 1 to 3 —SO$_2$CH$_2$CH$_2$OSO$_3$H groups, or a mixture of such dyestuffs; 0 to 10% by weight of water-soluble inert inorganic salt; and 45 to 95% by weight of water; said liquid dye composition having a pH of about 2.5 to about 4.5 and being substantially free of buffer substances.

2. A composition according to claim 1 wherein said inert inorganic salt is selected from alkali metal or ammonium chlorides or sulfates or mixtures thereof.

3. A composition according to claim 2 which contains 0 to 6% inert inorganic salt.

4. A composition according to claim 3 wherein said water-soluble, fiber-reactive dyestuff has, in its free acid form, the formula (HO$_3$S)$_m$—F—(SO$_2$CH$_2$CH$_2$OSO$_3$H)$_n$ wherein F is the chomophoric radical of a monoazo, disazo, anthraquinone, or phthalocyanine dyestuff, or a copper, nickel, chromium or cobalt metal complex thereof, m is an integer from 1 to 4 and n is an integer from 1 to 3.

5. A composition according to claim 4 wherein m is 1 and n is 1.

6. A composition according to claim 1 wherein said dyestuff, in its free acid form, has a formula selected from the group consisting of

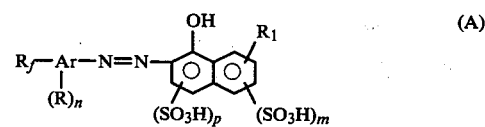
(A)

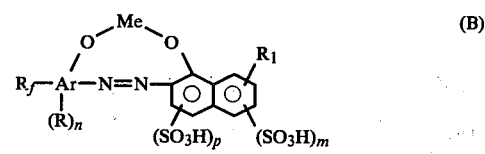
(B)

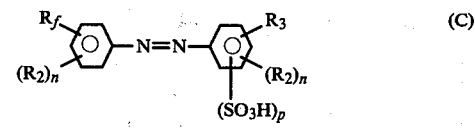
(C)

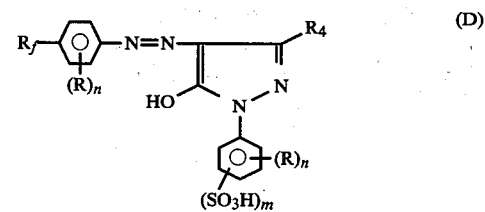
(D)

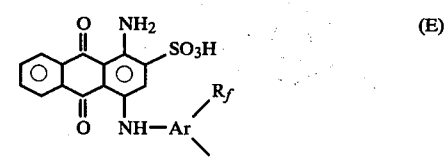
(E)

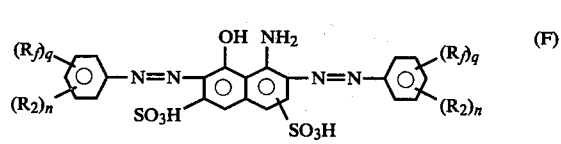
(F)

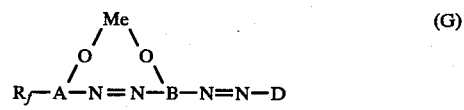
(G)

wherein

A is 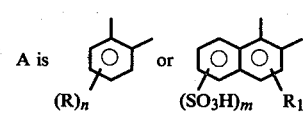

B is 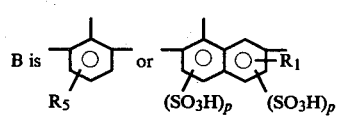

-continued

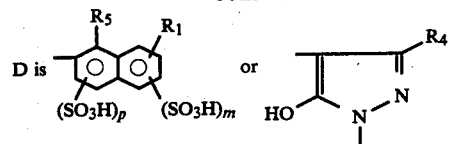

D is

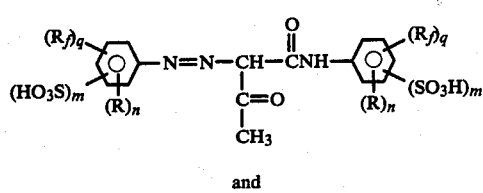

and

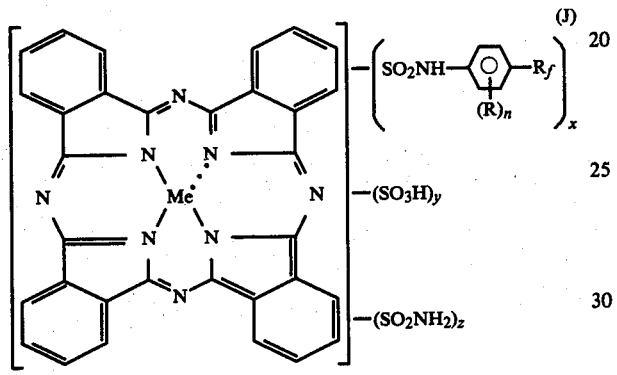

wherein Ar is

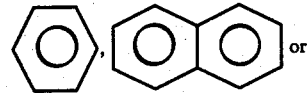

-continued

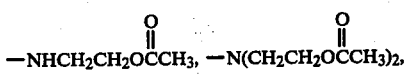

$R_f$ is —SO$_2$CH$_2$CH$_2$OSO$_3$H;

R is independently selected from lower alkyl, lower alkoxy, bromo, chloro, nitro, trifluoromethyl, lower alkylamino, carboxy and sulfo;

$R_1$ is independently selected from amino, lower alkylamino, lower alkanoyl amino, benzoyl amino, and benzoyl amino substituted by chloro, bromo, nitro, trifluoromethyl, lower alkyl or lower alkoxy;

$R_2$ is independently selected from R and $R_1$;

$R_3$ is H, —NHCH$_2$CH$_2$OH, —N(CH$_2$CH$_2$OH)$_2$,

—NHCH$_2$CH$_2$OCCH$_3$, —N(CH$_2$CH$_2$OCCH$_3$)$_2$,

—NHCH$_2$CH$_2$OSO$_3$H, —N(CH$_2$CH$_2$OSO$_3$H)$_2$,

—NHCH$_2$CH$_2$CN' or —N(CH$_2$CH$_2$CN)$_2$;

$R_4$ is lower alkyl, carboxy, lower alkoxy carbonyl, or carbamoyl;

$R_5$ is H or OH;

Me is Cu, Ni, Co, or Cr;

m is independently 0, 1 or 2;

n is independently 0, 1 or 2;

p is independently 0 or 1;

q is independently 0 or 1, provided that at least one q in a given structure is 1; and x and y are independently 1 or 2, and z is 0, 1 or 2, provided that x+y+z=3 or 4.

7. The composition of claim 6 wherein Me is Cu.

8. A composition according to claim 1 wherein said dyestuff, in its free acid form, has a formula selected from the group consisting of

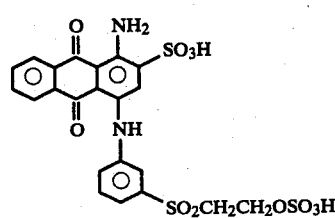

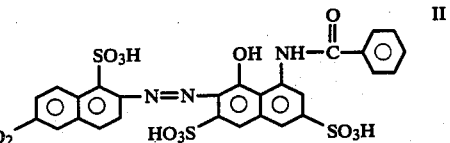

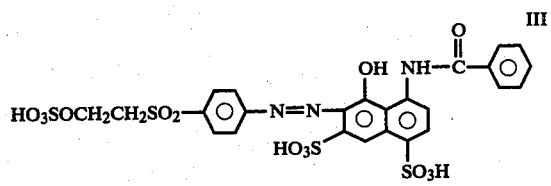

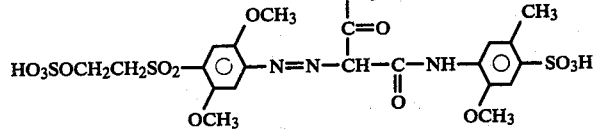

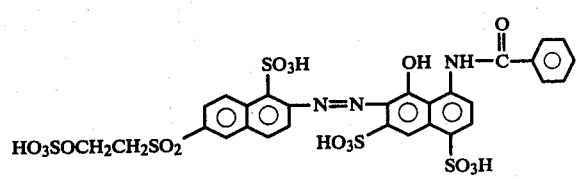

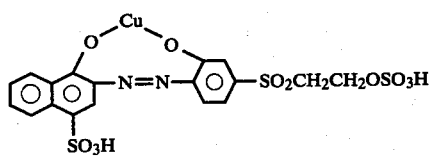

-continued
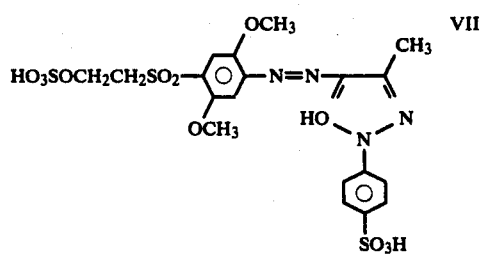
VII
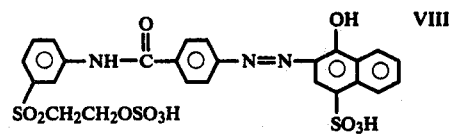
VIII
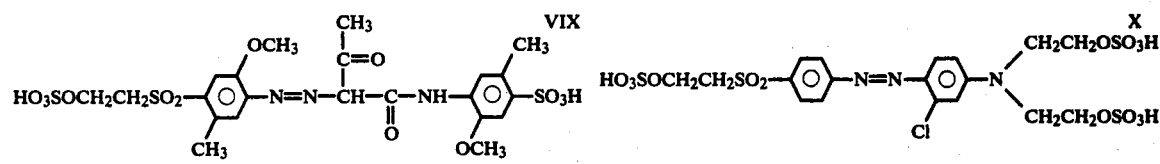
VIX                    X
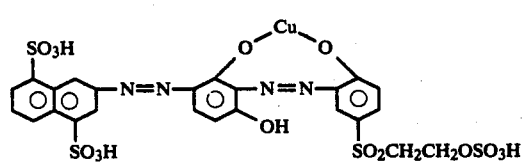
XI
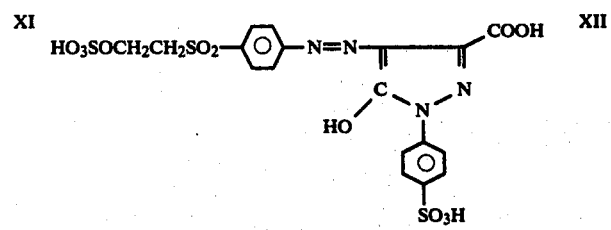
XII
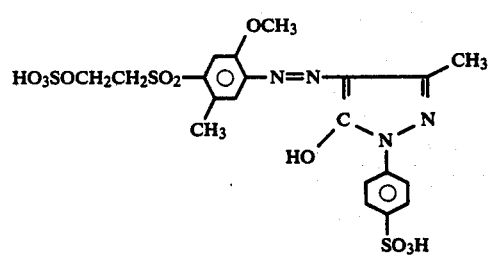
XIII
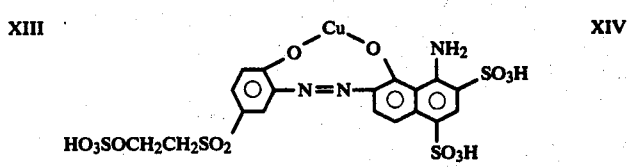
XIV
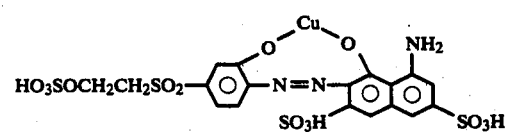
XV
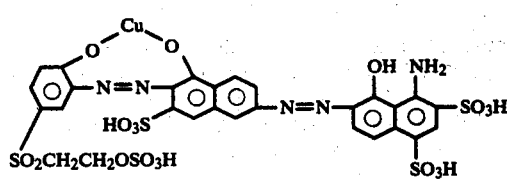
XVI
R = H  XVII
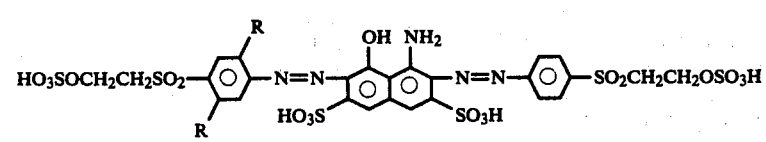
R = OCH₃  XVIII
XIX
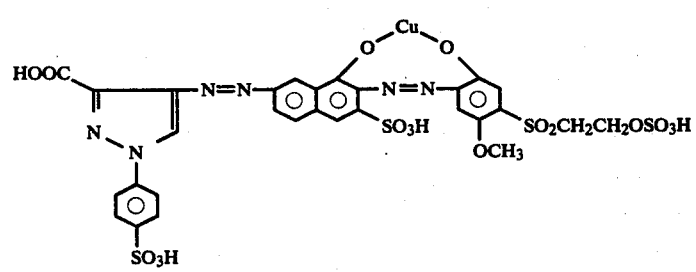

-continued

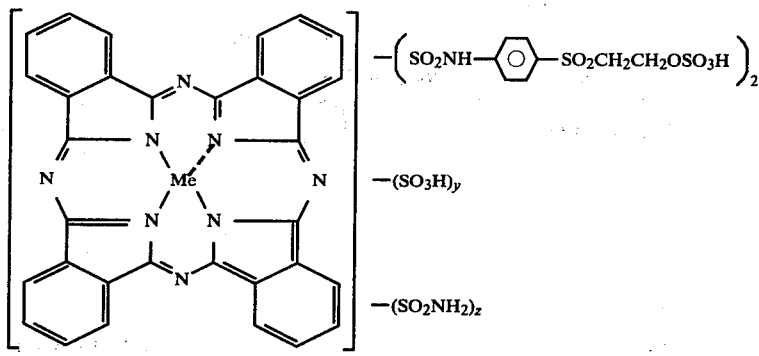

Me = Ni  y = z  z = o   XXI   Me = Cu  y = 1  z = 1   XXII   Me = Cu  y = z  z = o   XX

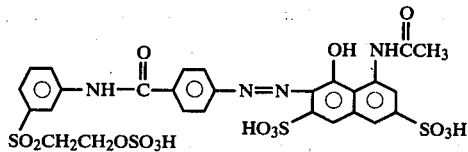 XXIII

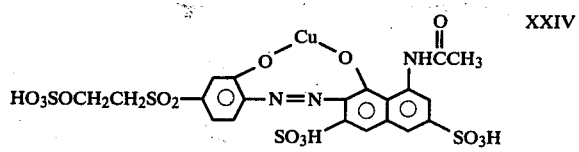 XXIV

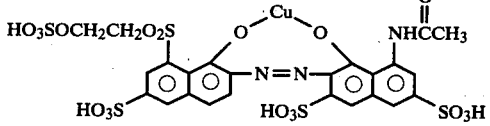 XXV

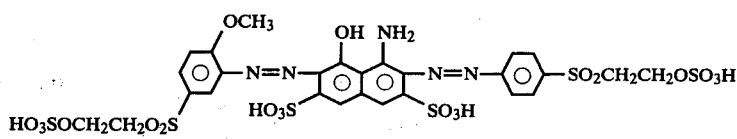 XXVI

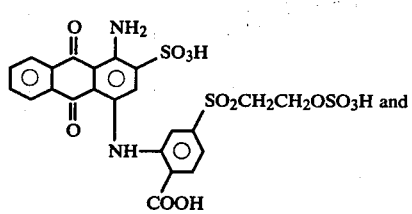 XXVII

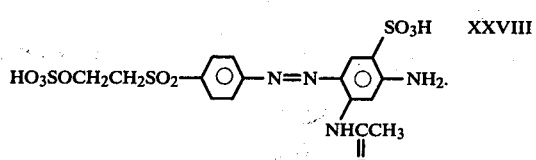 XXVIII

9. A composition according to claim 8 which contains 10 to 20% of said dyestuff, 0 to 6% of said inert inorganic salt, and 75 to 90% water.

10. A composition according to claim 8 which contains 30 to 40% of said dyestuff, 0 to 6% of said inert inorganic salt, and 55–70% water.

11. A method of stabilizing an aqueous, liquid fiber-reactive dye composition against decomposition during storage, wherein said dye composition contains from 5 to 45% of a water-soluble, fiber-reactive dyestuff having from 1 to 3 —SO$_2$CH$_2$CH$_2$OSO$_3$H groups, which method comprises adjusting the pH of said dye composition to about 2.5 to about 4.5 and maintaining it at about 0° to 50° C.

12. A method of storing an aqueous, liquid fiber-reactive dye composition for periods in excess of thirty days with minimum decomposition, wherein said dye composition contains from 5 to 45% of a water soluble, fiber-reactive dyestuff having from 1 to 3 —SO$_2$CH$_2$C-H$_2$OSO$_3$H groups, which method comprises adjusting the pH of said dye composition to about 2.5 to about 4.5 and storing said composition at 0° to 50° C.

* * * * *

UNITED STATES PATENT AND TRADEMARK OFFICE
CERTIFICATE OF CORRECTION

PATENT NO. : 4,448,583
DATED : May 15, 1984
INVENTOR(S) : Anthony J. Corso

It is certified that error appears in the above-identified patent and that said Letters Patent is hereby corrected as shown below:

Claim 11, line 1 should read, "A method of stabilizing an aqueous, substantially free of buffer substances, liquid fiber-".

Claim 12, line 1 should read, "A method of stabilizing an aqueous, substantially free of buffer substances, liquid fiber-".

Signed and Sealed this

Sixth Day of May 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,448,583
DATED : May 15, 1984
INVENTOR(S) : Anthony J. Corso

It is certified that error appears in the above-identified patent and that said Letters Patent is hereby corrected as shown below:

Claim 12, line 1 should read, "A method of storing an aqueous, substantially free of buffer substances, liquid fiber-".

Signed and Sealed this

Twenty-ninth Day of July 1986

[SEAL]

Attest:

Attesting Officer

DONALD J. QUIGG

Commissioner of Patents and Trademarks